United States Patent
Narang et al.

(10) Patent No.: US 11,900,705 B2
(45) Date of Patent: Feb. 13, 2024

(54) INTELLIGENT ENGINEERING DATA DIGITIZATION

(71) Applicant: ACCENTURE GLOBAL SOLUTIONS LIMITED, Dublin (IE)

(72) Inventors: Neeru Narang, San Jose, CA (US); Guanglei Xiong, Pleasanton, CA (US); Ullas Balan Nambiar, Bangalore (IN); Emmanuel Munguia Tapia, San Jose, CA (US); Ditty Mathew, Vaikom (IN); Omar Razi, Bangalore (IN); David Alfonso Guerra, San Antonio, TX (US); Thyagarajan Delli, Bangalore (IN)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 357 days.

(21) Appl. No.: 17/221,564

(22) Filed: Apr. 2, 2021

(65) Prior Publication Data
US 2022/0318546 A1    Oct. 6, 2022

(51) Int. Cl.
| | |
|---|---|
| G06F 17/00 | (2019.01) |
| G06V 30/413 | (2022.01) |
| G06F 40/169 | (2020.01) |
| G06F 40/177 | (2020.01) |
| G06V 10/25 | (2022.01) |
| G06V 30/414 | (2022.01) |
| G06V 30/10 | (2022.01) |

(52) U.S. Cl.
CPC .......... *G06V 30/413* (2022.01); *G06F 40/169* (2020.01); *G06F 40/177* (2020.01); *G06V 10/25* (2022.01); *G06V 30/10* (2022.01); *G06V 30/414* (2022.01)

(58) Field of Classification Search
CPC ...... G06V 30/413; G06V 10/25; G06V 30/10; G06V 30/414; G06F 40/169; G06F 40/177
See application file for complete search history.

(56) References Cited

U.S. PATENT DOCUMENTS

| | | | | |
|---|---|---|---|---|
| 6,502,084 B1 * | 12/2002 | Boleyn | ................ | G06N 5/025 |
| | | | | 706/45 |
| 8,201,085 B2 * | 6/2012 | Rollins | ................ | G06F 16/93 |
| | | | | 715/255 |
| 9,176,938 B1 * | 11/2015 | Kerschen | ................ | G06F 16/93 |
| 9,244,680 B2 * | 1/2016 | Phelan | ................ | G06F 8/73 |

(Continued)

OTHER PUBLICATIONS

Rica et al., "Reducing Human Effort in Engineering Drawing Validation", 2020, ScienceDirect, 7 pages (Year: 2020).*

*Primary Examiner* — Mohammed H Zuberi
(74) *Attorney, Agent, or Firm* — Mannava & Kang, P.C.

(57) ABSTRACT

The validity of engineering drawings is automatically determined based on compliance of the specifications of the engineering drawings with automatically generated rules. A document package including images of the engineering drawings and related documents is received. Rules codifying the requirements to be fulfilled by the engineering drawings are automatically generated from the related documents. Data such as specifications of the various parts of the entities in the engineering drawings are automatically extracted. The extracted data is analyzed to determine compliance with the rules to validate the engineering drawings.

19 Claims, 17 Drawing Sheets

(56) References Cited

U.S. PATENT DOCUMENTS

| | | | |
|---|---|---|---|
| 2002/0035408 A1* | 3/2002 | Smith | G06Q 10/10 |
| | | | 345/418 |
| 2004/0218215 A1* | 11/2004 | Sickel | G06Q 10/087 |
| | | | 358/1.18 |
| 2005/0060317 A1* | 3/2005 | Lott | G06Q 10/00 |
| | | | 715/239 |
| 2006/0288285 A1* | 12/2006 | Lai | G06F 40/226 |
| | | | 715/708 |
| 2014/0214758 A1* | 7/2014 | Tripathi | G06F 16/93 |
| | | | 707/608 |
| 2015/0161193 A1* | 6/2015 | Damodar | G06F 16/2365 |
| | | | 707/694 |
| 2016/0283871 A1* | 9/2016 | Gupte | G06Q 10/063 |
| 2017/0116179 A1* | 4/2017 | Gagné-Langevin | |
| | | | G06F 40/106 |
| 2018/0018468 A1* | 1/2018 | Williams | G06F 21/64 |
| 2019/0220506 A1* | 7/2019 | Nieminen | G06F 30/13 |
| 2021/0407111 A1* | 12/2021 | Lee | G06F 16/583 |
| 2022/0391627 A1* | 12/2022 | Powles | G06Q 10/103 |
| 2023/0096955 A1* | 3/2023 | O'Sullivan | G06F 40/169 |
| | | | 715/230 |

* cited by examiner

| | | | FORM - 2 | | | | RESULTS | | | REPORT 80 | | |
|---|---|---|---|---|---|---|---|---|---|---|---|---|
| | 5. MATERIAL OR PROCESS NAME | 6. SPECIFICATION NUMBER | 7. CODE | 8. SPECIAL PROCESS SUPPLIER CODE | 9. CUSTOMER APPROVAL VERIFICATION (YES/NO/NA) | 10. CERTIFICATE OF CONFORMANCE NUMBER | IS VALID | CONFIDENCE SCORE | SUPPLIER NUMBER INCLUDED | MATCHING SPECIFICATION NUMBER | MATCHING VENDOR NUMBER | MATCHING COMPANY NAME | MATCHING ADDRESS |
| 0 | ALUMINUM ALLOY | SHEET AMS 4015E | | CHARLESTON ALUMINUM | YES | 97621 | NOT VALID | 58.5 | | AMS 2401 | 119476 | SAPORITO FINISHING CO. | 3119 S. AUSTIN AVENUE CICERO IL |
| 1 | WELDING | MIL-W-8604 | | ALLOYWELD INSPECTION COMPANY / 796 MAPLE LANE BENSENVILLE, IL | YES | 97621 | VALID | 100 | NOT INCLUDED | MIL-W-8604 | 119386 | ALLOYWELD INSPECTION COMPANY | 796 MAPLE LANE BENSENVILLE IL |

TO FIG. 9 CONT.

FROM FIG. 9

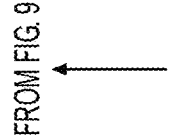

| | 1. PART NUMBER 211A999-101 | | | 4. FAI REPORT 3. SERIAL NUMBER 2. PART NAME N/A BRACKET, NUT PLATE 1001 | | | | | RESULTS | | |
|---|---|---|---|---|---|---|---|---|---|---|---|
| 5. CHAR NO. | 6. REFERENCE LOCATION | 7. CHARACTER-ISTIC DESIGNATOR | 8. REQUIREMENT | 9. RESULTS | 10. DESIGNED TOOLING | 11. NON-CONFORMANCE NUMBER | 14A. FAI INSP. MEAS. EQUIP. | 14B. FAI INSPECTOR IDENT. | 14C. MFG OP# & MEAS. EQUIP. | FORM 3 CONFORMANCE | EDD CONFORMANCE | CONFIDENCE SCORE |
| 0 | 27 C5 | MINOR | LENGTH (.15+-.03) IN | 0.15 | | | CALIPER | JAKE S. | CALIPER OP79866 | VALID | VALID | 86% |
| 1 | 28 C6 | MINOR | BASIC .281 IN | PASS | | | VISUAL | JAKE S. | VISUAL | | | |
| 2 | 29 C5 | MINOR | BASIC .562 IN | PASS | | | VISUAL | JAKE S. | VISUAL | | | |
| 3 | 30 B6 | MINOR | LENGTH (2.00-+.03) IN | 2 | | | CALIPER | JAKE S. | CALIPER OP79866 | VALID | VALID | 93% |
| 4 | 31 C3 | MINOR | BASIC .40 IN | PASS | | | VISUAL | JAKE S. | VISUAL | | | |
| 5 | 32 B8 | MINOR | LENGTH (.076-.084)IN | 0.08 | | | CALIPER | JAKE S. | CALIPER OP79866 | VALID | VALID | 99% |
| 6 | 33 B8 | MINOR | LENGTH (.26-+.03) IN | 0.26 | | | CALIPER | JAKE S. | CALIPER OP79866 | VALID | VALID | 77% |
| 7 | 34 B8 | MINOR | LENGTH (.12-.20) IN | 0.15 | | | CALIPER | JAKE S. | CALIPER OP79866 | VALID | VALID | 92% |
| 8 | 35 A8 | MINOR | DIA (1.00+-.03) IN | 1 | | | CALIPER | JAKE S. | CALIPER OP79866 | VALID | VALID | 60% |
| 9 | 36 B7 | MINOR | LENGHT (.82-.93) IN | 0.9 | | | CALIPER | JAKE S. | CALIPER OP79866 | FALLOUT | VALID | 86% |

INTELLIGENT ENGINEERING DATA DIGITIZATION

BACKGROUND

An engineering drawing is a subcategory of technical drawings which can be used to convey all the information necessary for manufacturing a product or a part. The information conveyed in the engineering drawings can include dimensions, part names, numbers, etc. Therefore, a manufacturing engineer can start the production process upon receiving the completed engineering drawings. Engineering drawings use standardized language and symbols which makes understanding the drawings simple and requiring few personal interpretation possibilities. The development of Computer-Aided Design (CAD) tools enables the generation of drawings with a few clicks. Digitized drawings can be used to improve the efficiency of processes such as the first article inspection (FAI) process which requires a thorough inspection and analysis of the drawing data.

BRIEF DESCRIPTION OF DRAWINGS

Features of the present disclosure are illustrated by way of examples shown in the following figures. In the following figures, like numerals indicate like elements, in which:

FIG. 9 shows an example of a list of parts and statuses generated in accordance with the examples disclosed herein.

DETAILED DESCRIPTION

Figure 1:
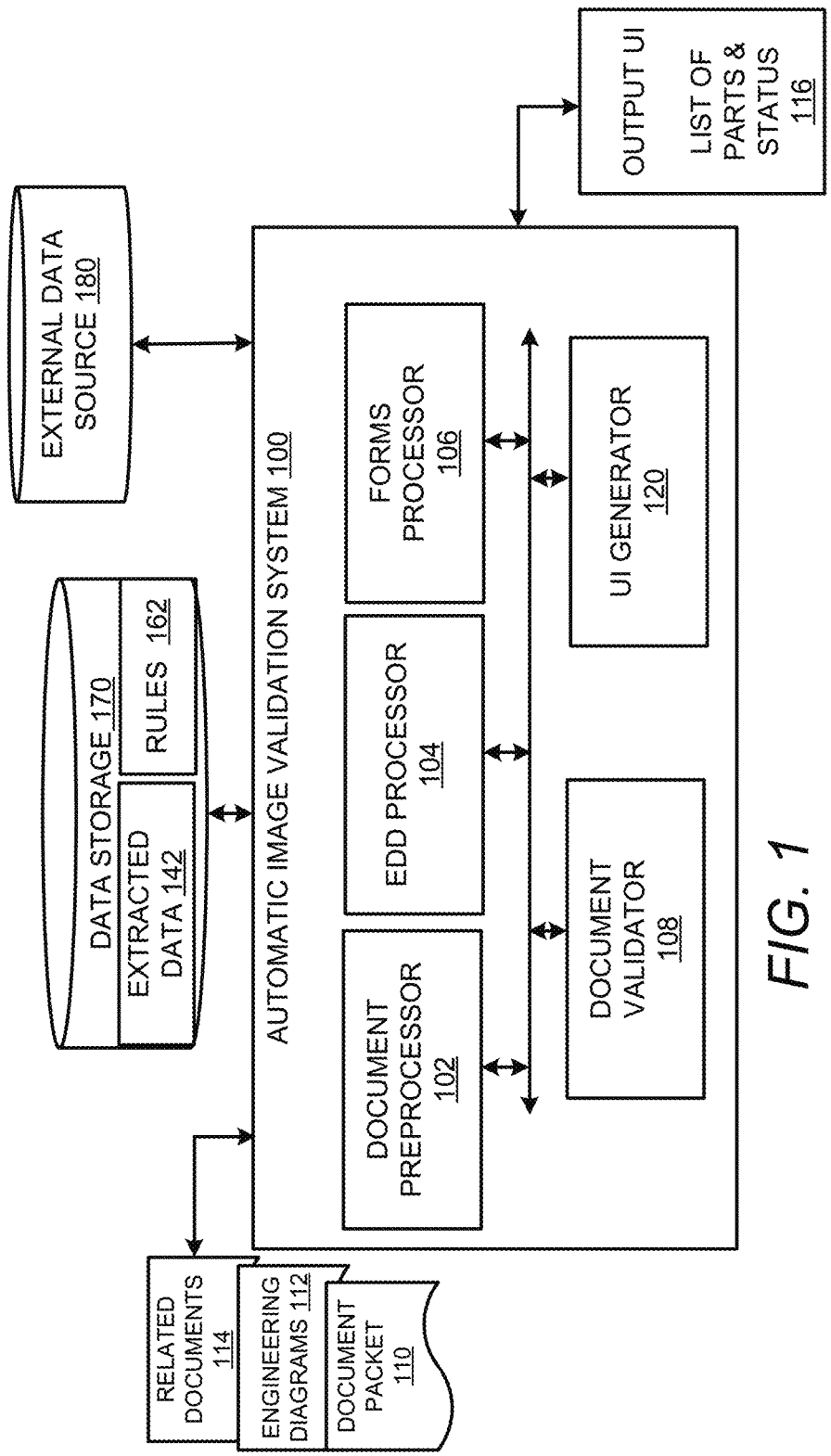
FIG. 1 shows a block diagram of an automatic image validation system in accordance with the examples disclosed herein.

For simplicity and illustrative purposes, the present disclosure is described by referring to examples thereof. In the following description, numerous specific details are set forth in order to provide a thorough understanding of the present disclosure. It will be readily apparent however that the present disclosure may be practiced without limitation to these specific details. In other instances, some methods and structures have not been described in detail so as not to unnecessarily obscure the present disclosure. Throughout the present disclosure, the terms "a" and "an" are intended to denote at least one of a particular element. As used herein, the term "includes" means includes but not limited to, the term "including" means including but not limited to. The term "based on" means based at least in part on.

An automatic image validation system is disclosed which validates engineering drawings based on requirements from related documents. A document package including images with the engineering drawings and the related documents including at least a first document with one or more tables is initially received for example, from an automated inbox or may be accessed from a network location, a local data store, etc. The document package is analyzed to separately identify images with the engineering drawings and the first document with the tables having requirements to be employed for validating the engineering drawings. The requirements can specify the attributes associated with various parts of the engineering drawings such as the dimensions of specific parts of the hardware/machinery from the engineering drawings, etc. The engineering drawings can include black-and-white line drawings with colored annotations including various views of the different parts. The annotations provide specific identifiers such as numbers, letters, special characters, etc. to label different parts. The specific identifiers can be further used to identify the corresponding requirements from the one or more tables that have to be fulfilled for each of the different parts of the engineering drawings.

The engineering drawings are initially analyzed for extracting data which includes the specifications or attributes of the parts. The engineering drawings are initially digitized for further processing. Generally, the annotations are made in specific colors other than black or white can include just the specific identifiers or the specific identifiers enclosed in geometrical figures such as rectangles, circles, etc. Therefore, the digitized engineering drawings are initially processed using statistical techniques such as color histograms to identify the color of the annotations. Binary images are produced by removing all the color information from the engineering drawings except for the annotation color. The annotation labels are identified and their locations or positions within the engineering drawings are detected based on the binary images. In an example, the deep learning models can be trained to identify the different types of annotation labels. Each engineering drawing is then further processed in terms of zone regions for label data extraction. The zone region can correspond to a specific portion of the engineering drawing that is selected for data extraction. The size and shape of the zone region can be predetermined empirically or may be determined dynamically to enclose at least one annotation label and data elements for specifications corresponding to the annotation label. In an example, if the annotation labels are closely positioned, a single zone region may cover multiple annotation labels and the corresponding specifications. OCR extraction techniques are employed within the zone regions for label data extraction. In an example, the extracted label data can be populated to a results column of one of the related documents such as a specifications document.

One of the related documents such as a specifications document can include requirements that have to be fulfilled or complied with by the different parts of the engineering drawings to be considered valid. These requirements generally include quantitative requirements with specific ranges for particular quantities and may be conveyed in different formats. Two different expressions that convey the same meaning can be used to express the same requirement. Hence, simple text extraction or string comparison techniques cannot be used to validate the engineering drawings. The related documents are therefore processed to extract the requirements and frame rules which are to be fulfilled by the specifications given in the engineering drawings. For each annotation label, the specifications from the engineering drawings are validated against the corresponding automatically extracted rules that enforce limits outlined in the requirements. An output UI is populated with the list of parts that were evaluated and the corresponding validity statuses which can include validity or invalidity of the parts.

The automatic image validation process described herein finds applications in use case scenarios such as FAI. Although the engineering drawings are generated using computer tools and the related documents are digitized, computers are not enabled for automatic validation of the engineering drawings and therefore cannot be employed for processes such as FAI. This is because common optical character recognition (OCR) tools cannot be applied to the engineering drawings for data extraction due to various reasons. One of the reasons includes the high complexity of the engineering drawings. Other reasons can include the different types of annotations used to label the parts, the overlapping of closely-spaced annotations, the background/surrounding noise in the engineering drawings, or other structural information loss from OCR extraction, etc. Furthermore, similar requirements can be provided in different formats within different related documents received in the same document packet. The rules framed per the examples disclosed herein, enable automatic validation of specifications from the images with the requirements set forth in the related documents. The automatic image validation, therefore, leverages various Artificial Intelligence (AI) and OCR techniques to improve the functioning of computers by enabling the computers for automatic image validation.

FIG. 1 shows a block diagram of an automatic image validation system 100 in accordance with the examples disclosed herein. The system 100 receives a document package 110 which includes one or more images of engineering drawings 112 and at least one related document(s) 114 with one or more tables having data that can be used for validating the engineering drawings 112 which include figures of machinery, circuits, or other equipment/hardware. The engineering drawings 112 are annotated with details regarding the dimensions or other attributes of the parts of the equipment/hardware. For example, the system 100 can extract dimensions of a machine part from the engineering drawings 112, and verify if the dimensions of the machine part are compliant with the requirements outlined in the related documents 114. Such verification or validation can be carried out for each annotated part in the engineering drawings and a UI including a list of parts 116 with statuses as having passed or failed the specifications can be generated with parts marked as pass/valid if the dimensions of the parts comply with the corresponding requirements whereas for parts with non-compliant dimensions can be marked as fail/invalid. In some examples, certain parts may be identified as partial match with low confidence scores that can be indicative of the conformance of the parts with the specifications. The invalid and partial match parts can be flagged for further human review in the list of verified parts 116.

The system 100 can be employed in processes such as First Article Inspection (FAI) which is a formal method of providing a reported measurement for each manufactured feature of a part or assembly. Typically, the supplier performs the FAI, and the purchaser reviews or approves the report. Another method is for both the supplier and purchaser to perform the First Article on the ordered product. The evaluation report ensures that all the properties and features are compliant to its specifications, for example, a drawing. While some elements of the system 100 are illustrated with respect to the FAI process, it can be appreciated that the system 100 can also be used for other processes for rule-based validation of image information.

The system 100 includes a document preprocessor 102, an EDD processor 104, a forms processor 106, a document validator 108, and output UI generator 120. In an example, the system 100 can be communicatively coupled to a processor-readable data storage 170 to store and retrieve data used in the various processes. The document preprocessor 102 accesses the document package 110 to separately identify the document(s) with the engineering drawings 112 and the related document(s) 114 with the data tables. In an example, the documents with the engineering drawings 112 can be received in image formats such as .jpg, gif, or as portable document format (PDF) files, scanned images, etc. The related documents 114 can be received in a machine-readable format so that the tables can be read directly and data extracted without further processing by the document preprocessor 102. Based at least on the formats, the document preprocessor 102 can separately identify the contents of the document package 110. In a further example, the document preprocessor 102 can be configured to determine if the specifications or attributes of materials and/or processes included in the related documents 114 are approved specifications. The determination regarding the approved attributes is made by parsing and tokenizing the related documents 114 or extracting text via OCR and comparing the resultant data with the requirements specified in external data sources 180 via e.g., fuzzy matching. Referring to the FAI example, additional processing by the document preprocessor 102 can include differentiating between the specification form and supplier form using characteristics of the forms such as the number of columns, column headers, formats of the documents including the specification and supplier forms, etc. and verifying data from the supplier form with a supplier database in the FAI inspection process. Any unapproved/unauthorized specifications in the related documents 114 may be marked.

The documents including the engineering drawings 112 are provided to the EDD processor 104 for data extraction. The engineering drawings 112 can include diagrams of machine parts, wherein at least some of the machine parts are annotated or labeled with identifiers and certain attributes of the machine parts. For example, the attributes can include dimensions or sizes of the machine parts and/or their components. The engineering drawings 112 are initially digitized to enable extraction of textual data. However, simple OCR fails in the accurate extraction of data from the engineering drawings 112. The EDD processor 104 can be configured to identify and process different kinds of annotations for data extraction. Also, the EDD processor 104 can be configured to separately analyze different regions of the engineering drawings 112 for accurate data extraction. In an example, the extracted data 142 from the engineering drawings 112 can be provided to the document validator 108 for further validation.

The forms processor 106 can process the related documents 114 which include machine-readable data such as tables, lists, etc. that can be used to validate the engineering drawings 112. The system 100 can receive different forms for FAI processes such as a specification form, a supplier form, etc., as part of the related documents 114. In an example, rules 162 are automatically extracted from the received forms e.g., the specification forms to validate data in the images including the engineering drawings 112. More particularly, the requirements in the specification forms can be generalized into rules 162 that enable automatic validation of the extracted data 142. The rules 162 extracted from the related documents 114 are provided to the document validator 108 for validating the engineering drawings 112. The forms processor 106 can be further configured to determine if the specifications or attributes of materials and/or processes included in the related documents 114 are approved specifications. The determination regarding the approved attributes is made by parsing and tokenizing the related documents 114 or extracting text via OCR and comparing the resultant data with the requirements specified in external data sources 180 via e.g., fuzzy matching. Referring to the FAI example, additional processing by the forms processor 106 can include verifying data from the supplier form with an external data source 180 such as a supplier database in the FAI inspection process. Any unapproved/unauthorized specifications in the related documents 114 may be marked. In an example, the extracted data 142 from the engineering drawings 112 can be uploaded to one of the related documents 114, e.g., a specification form. For example, cells of a results column in the specification form can be updated with at least the specifications of the parts in the extracted data 142 based on correspondence to the label data associated with the cells. The corresponding label data can be identified by correlating identifiers from the specification form with identifiers included in the annotation labels.

The document validator 108 receives the extracted data 142 obtained from the engineering drawings 112 and the rules 162 that are automatically extracted from the related documents 114 to determine if the extracted data 142 conforms with the rules 162. Based on the conformance of the extracted data 142 and the validity of the data in the related documents 114, a validity status can be determined for each of the parts based on a match score determined by the document validator 108. In an example, two thresholds may be defined within the document validator 108 for a given document package so that when the match score of a part exceeds the first threshold, the part can be automatically labeled as valid. When the match score exceeds a second threshold which is lower than the first threshold, the part can be labeled as partially valid and flagged for human review. When the match score falls below the second threshold, the part is automatically labeled as invalid.

The results from the document validator 108 are provided to the output UI generator 120. In an example, the output UI generator 120 can provide for browser-based UIs to deliver the results of the validation procedure. The browser-based UIs can display a list of the parts 116 marked as valid or invalid based on the conformance of the specifications of the annotated parts to corresponding rules. In another example, the list of parts 116 may be communicated by the system 100 to predetermined users as reports. When referring to the FAI example, a first article inspection report with the list of annotated parts and corresponding statuses can be provided to authorized parties.

Figure 2:
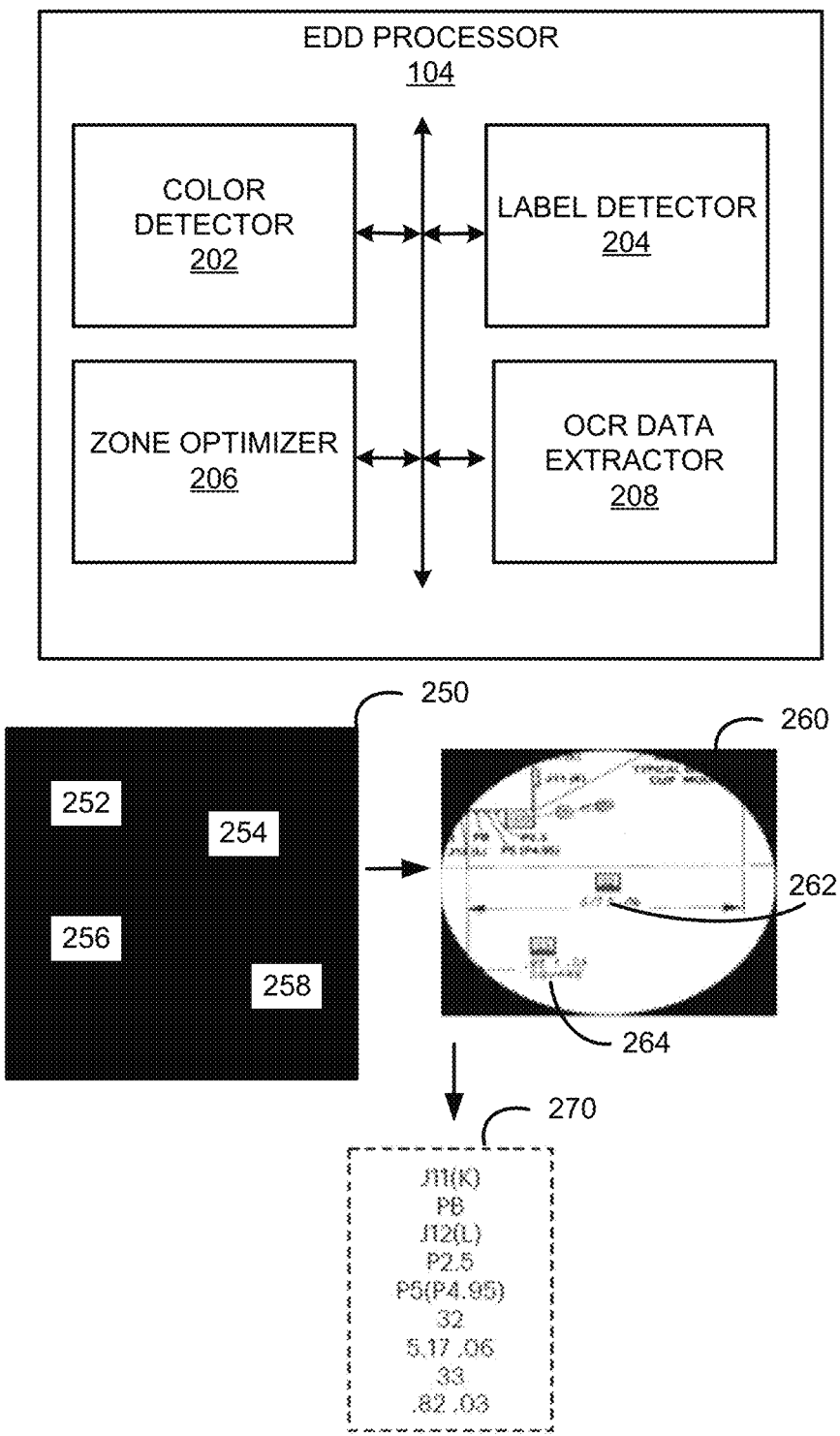
FIG. 2 shows a detailed block diagram of an engineering data digitization (EDD) processor in accordance with the examples disclosed herein.

FIG. 2 shows a detailed block diagram of the EDD processor 104 and a representative output of each of the components of the EDD processor 104 in accordance with the examples disclosed herein. The EDD processor 104 includes a color detector 202, a label detector 204, a zone optimizer 206, and an OCR data extractor 208. As mentioned above, the various parts of the engineering drawings 112 are annotated with corresponding attributes. Various types of annotations/annotation labels may be used to identify the parts. The annotation labels include one or more characters that may or may not be enclosed by geometric figures such as circles, squares, rectangles, etc. The OCR techniques that are generally used for text extraction are not accurate in extracting textual data from annotation labels in images. Accordingly, additional image processing is needed to improve text extracted from annotation labels. The engineering drawings 112 are generally black and white line drawings including annotation labels of different colors. The EDD processor 104, therefore, is configured with the color detector 202 to initially identify a dominant color (other than black and white) that is most used in the engineering drawings 112. In an example, the color detector 202 implements statistical techniques such as color histograms to identify the most used color.

Upon identifying the color, the label detector 204 filters out all color information other than the most used color to generate binary images of the most used color on a black background from the engineering drawings 112. The label detector 204 can be further configured to identify an extent of the image portion covered by the color using the x, y coordinates of the positions in the binary images where non-black color pixels are identified. Such positions are determined to be annotation labels by the label detector 204. Referring to the binary image 250 of a drawing generated by the color detector 202, various annotation labels 252, 254, 256, and 258 can be identified based on the color histogram and the positions identified by the label detector 204. The identification of the positions of the annotation labels within the engineering drawings 112 enables the system 100 to further search for attribute data associated with the parts identified by the annotation labels. Furthermore, techniques such as watershed segmentation can be applied to separately identify annotation labels in a collection wherein the annotation labels may be close enough to be touching each other or overlapping each other so that the entire label collection appears to be a color blob. In an example, the label detector 204 can include an image classifier for identifying different types of annotations and a deep neural network (DNN) that is trained to identify label positions from binary images. The training can include supervised training with training data including binary images wherein the positions of the annotation labels are identified or unsupervised training on data including the un-labeled binary images. In an example, different DNN models can be trained to identify annotations of different formats.

The zone optimizer 206 enables the system 100 to search for the part attributes identified by the annotation labels. The zone optimizer 206 is configured for analyzing each of the engineering drawings 112 in parts or zone region. Particularly, the zone optimizer 206 is configured for detecting zone regions in the images corresponding to the annotation labels wherein each zone region includes in entirety, at least one of the annotation labels and specifications of the part identified by the at least one annotation label. In an example, a zone region can cover a greater number of annotation labels also along with the entireties of the attributes they identify. The size and specification of a zone region can be determined empirically by verifying the accuracy of the results produced from zone regions of various sizes so that the zone optimizer 206 generates zone regions small enough for good resolution but large enough to capture at least one annotation label and the attribute data corresponding to that annotation label. In an example, the zone regions can be circular centered on each label position for data extraction. For example, zone region 260 is selected for data extraction. The zone region 260 includes two annotation labels and the corresponding attributes 262 and 264 in their entireties.

For each zone region identified by the zone optimizer 206, the OCR data extractor 208 implements OCR techniques to extract data from the zone region centered on a given annotation label. As mentioned above, the zone region can cover more than one annotation label and corresponding attribute data. The label entries included in the extracted data 142 obtained from different zone regions can be compared and deduplicated to remove duplicate data wherein multiple entries from the same label are obtained from different zone regions. For example, the label entries 270 are extracted from the zone region 260 by the OCR data extractor 208. In an example, the attribute values extracted from the engineering drawings 112 can be entered into a results column of the specification form.

Figure 3:
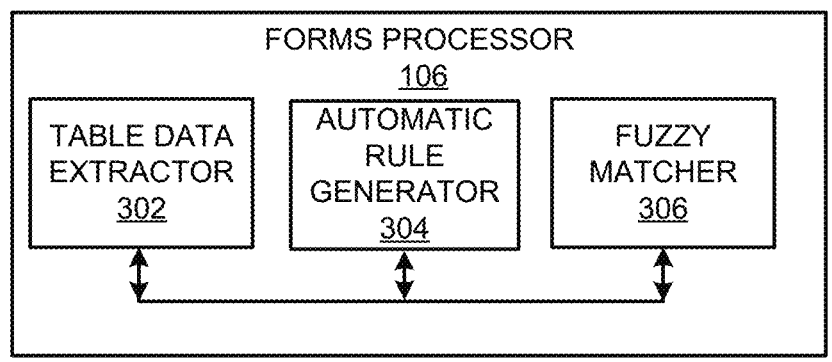
FIG. 3 shows a detailed block diagram of a forms processor in accordance with the examples disclosed herein.

FIG. 3 shows a detailed block diagram of the forms processor 106 in accordance with the examples disclosed herein. The forms processor 106 includes a table data extractor 302, an automatic rule generator 304, and a fuzzy matcher 306. The forms processor 106 is configured to process different forms received in the documents package 110. Referring again to the FAI example, the related documents 114 can include different types of digitized forms such as a specifications form and a supplier form. Based on the number of columns, the column headers, etc., the forms processor 106 can be configured to separately identify the different types of forms and process them accordingly. The table data extractor 302 can be configured to extract data from the tables of the digitized forms using deep document understanding (DDU) techniques. Based on the type of form being processed, the data from the table data extractor 302 can be transmitted to the automatic rule generator 304 or the fuzzy matcher 306. For example, if the supplier form is to be processed, the data from the table data extractor 302 is provided to the fuzzy matcher 306 which can be configured to determine if the specifications or attributes of materials and/or processes included in the supplier form are approved specifications. The determination regarding the approved attributes is made by comparing the resultant data obtained by the table data extractor 302 from the supplier form with the requirements specified in external data sources 180 via e.g., fuzzy matching. Any unapproved/unauthorized specifications in the related documents 114 may be marked by the document validator 108.

If the form being processed is a specification form, then the data from tables of the specification form is employed to verify the label data extracted from the engineering drawings 112. The specification form can include tables with the requirements column for validating the engineering drawings 112. The automatic rule generator 304 enables interpreting data from cells in the requirements column to identify a value range for a given attribute extracted for a corresponding annotation label in the engineering drawings 112. The entries in the requirements column may state the same requirements in different formats. The automatic rule generator 304 can be configured to interpret the various requirements, identify and group synonymous requirements and generate a rule that representative of the different synonymous requirements grouped under one group. Different groups of requirements each associated with a corresponding rule can be thus generated.

Figure 4:
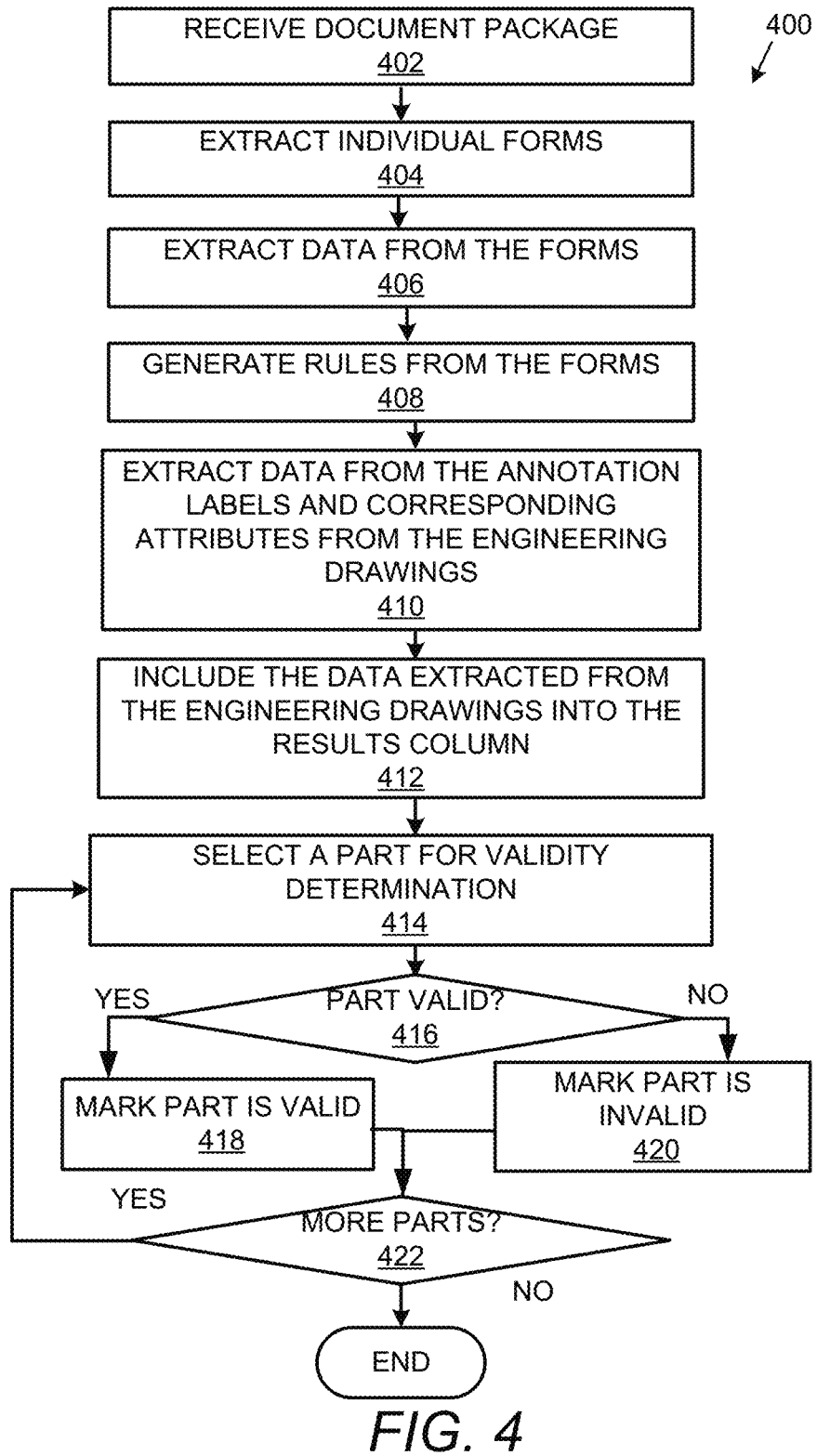
FIG. 4 shows a flowchart that details a method of validating engineering drawings in accordance with the examples disclosed herein.

FIG. 4 shows a flowchart 400 that details a method of validating engineering drawings 112 in accordance with the examples disclosed herein. The method begins at 402 wherein the document package is received. The documents package includes images of the engineering drawings 112 and the related documents 114 which can further include forms such as the supplier form, the specification form, etc. The individual documents or forms are extracted at 404 using, for example, formats of the different documents, the type of data included in the different documents, etc. At 406, the data is extracted from the various forms including the supplier form and the specification form. At 408, rules 162 are automatically generated from one of the forms, e.g., the specification form. The data regarding the various annotation labels and the corresponding attributes are extracted from the engineering drawings 112 at 410. At 412 the data extracted from the engineering drawings 112 is included in the results column of one of the documents e.g., the specification form. At 414, a part of the entity e.g., a machine is selected for determining validity. At 416, it is determined if the value extracted from the engineering drawings 112 included in the results column of the specification document for that part is compliant with the corresponding rule from the requirement column. If yes, then the part is marked as compliant or valid at 418 in the list of parts 116 generated for the output UI, else the part is marked as non-compliant or invalid at 420. It is determined at 422 if more parts are to be validated. If yes, the method returns to 414 to select the next part else if no parts remain for processing the method terminates on the end block.

Figure 5:
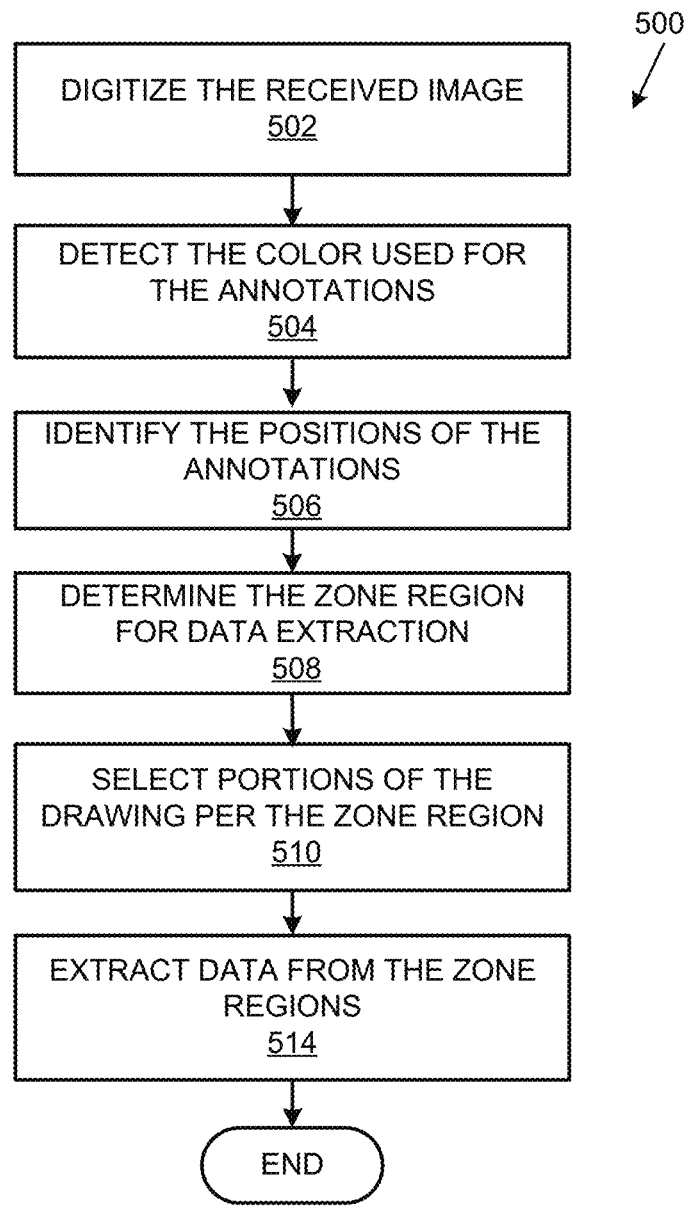
FIG. 5 shows a flowchart that details a method of extracting data from one of the engineering drawings in accordance with the examples disclosed herein.

FIG. 5 shows a flowchart 500 that details a method of extracting data from one of the engineering drawings 112 in accordance with the examples disclosed herein. The method begins at 502 wherein a received image of an engineering drawing is digitized so that the image is converted into documents (e.g., pdfs) that are machine-readable. In an example, step 502 may be optional as the engineering drawings 112 may be received as machine-readable documents. The color used for the annotations is initially detected at 504. As mentioned above, statistical methods such as the color histogram procedure are used to identify a third color (other than black and white) which is predominantly included in the images. The positions of the annotation labels in the third color are identified at 506 by deleting or filtering out all color information other than that of the third color so that binary images of the annotation labels of the third color on a black background are generated. More particularly, for each colored area in the binary image, the top left, top right (x1, y1) and the bottom left, bottom right (x2, y2) coordinates are identified as the annotation label coordinates/positions by the label detector 204. At 508, a zone region for data extraction is determined for one of the engineering drawings. The zone region can be a circular portion of the image of a predetermined radius centered on one of the annotation labels for which the data is to be extracted. The radius of the zone region can be obtained based on the size of the engineering drawing selected for analysis. Generally, in a given data package, the engineering drawings can be assumed to be of similar size so that the radius of the zone region is maintained until all the engineering drawings 112 are processed. However, in some examples, the radius of the zone region can be dynamically determined based on the size of the engineering drawing currently being processed. At 510 portions of the engineering drawing shaped and sized in accordance with the zone region are selected for data extraction by the zone optimizer 206 so that the entire engineering drawing is analyzed in terms of the number of zone regions. The data from the zone regions is extracted by the OCR data extractor 208 at 514.

Figure 6:
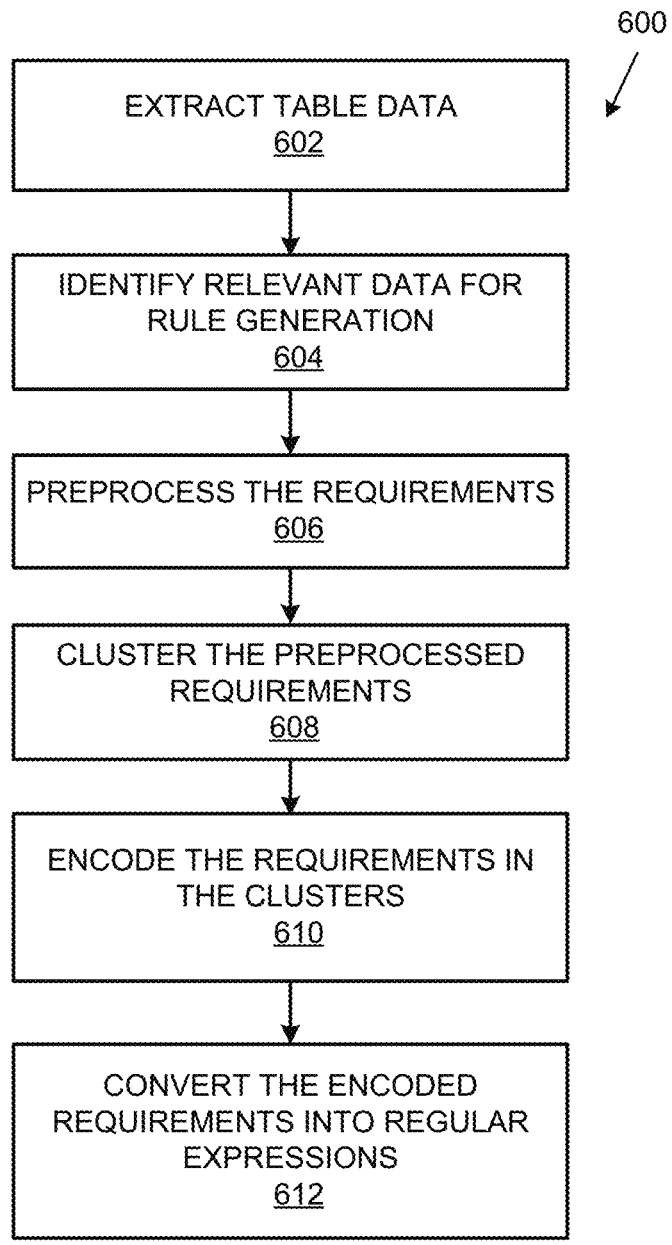
FIG. 6 shows a flowchart that details a method of automatically generating rules for validation of the engineering drawings in accordance with the examples disclosed herein.

FIG. 6 shows a flowchart that details a method of automatically generating the rules 162 in accordance with the examples disclosed herein. The method begins at 602 wherein the table data is extracted from the related documents 114 such as the specification form, the supplier form, etc. using DDU techniques. The relevant data for rule generation is identified at 604. The relevant data can be identified from the tables using column names, data formats, etc. For example, in the specification form the relevant data for rule extraction can include data from the requirements column and NLP along with string matching techniques, etc., can be used to identify the relevant data. The relevant data can include numerical expressions with/without strings in the form of requirements. The numerical expressions can be framed in different formats. For example, a requirement for a profile can be expressed as 'Profile (01+−0.03)', another requirement for an angle can be expressed as 'Angle (60−+1) degrees', or length can be expressed as 'Length (0.219±0.015)', etc. At 606, each of the requirements thus expressed is preprocessed by removing strings before the first numerical value and strings after the last numerical value with the exceptions being expressions such as MAX or MIN which are symbolic of operators affecting the quantities. At 608, the preprocessed requirements are clustered to group 'synonymous' requirements i.e., the requirements which are expressed differently but have the same meaning are clustered together using algorithms such as the k-means algorithm, etc. Alternately, the expressions which can be used interchangeably with the given numerical values are clustered. For example, expressions such as x1 To x2, x1–x2, x1−x2, x+−t can form a group since all these expressions provide an acceptable range with x1 as the lower limit and x2 as the upper limit or in the last case where x−t will be the lower limit and x+t will be the upper limit. Similarly, x+−t, x−+t, x+_t, can be clustered while <x, <=x or >x. >=x, form a couple of clusters. At 608, each preprocessed requirement in each of the clusters is encoded by converting each character. By way of illustration and not limitation, the digits may be encoded as 'd' while spaces are encoded as 's' and special characters are unchanged. Once all the expressions in each of the clusters are processed, the sequence alignments are computed for each of the clusters at 610. Sequence alignment enables identifying similar patterns in each cluster. The identified patterns of each of the clusters are converted into regular expressions at 612. The unaligned patterns are left as optional in the regular expressions.

Figure 7:
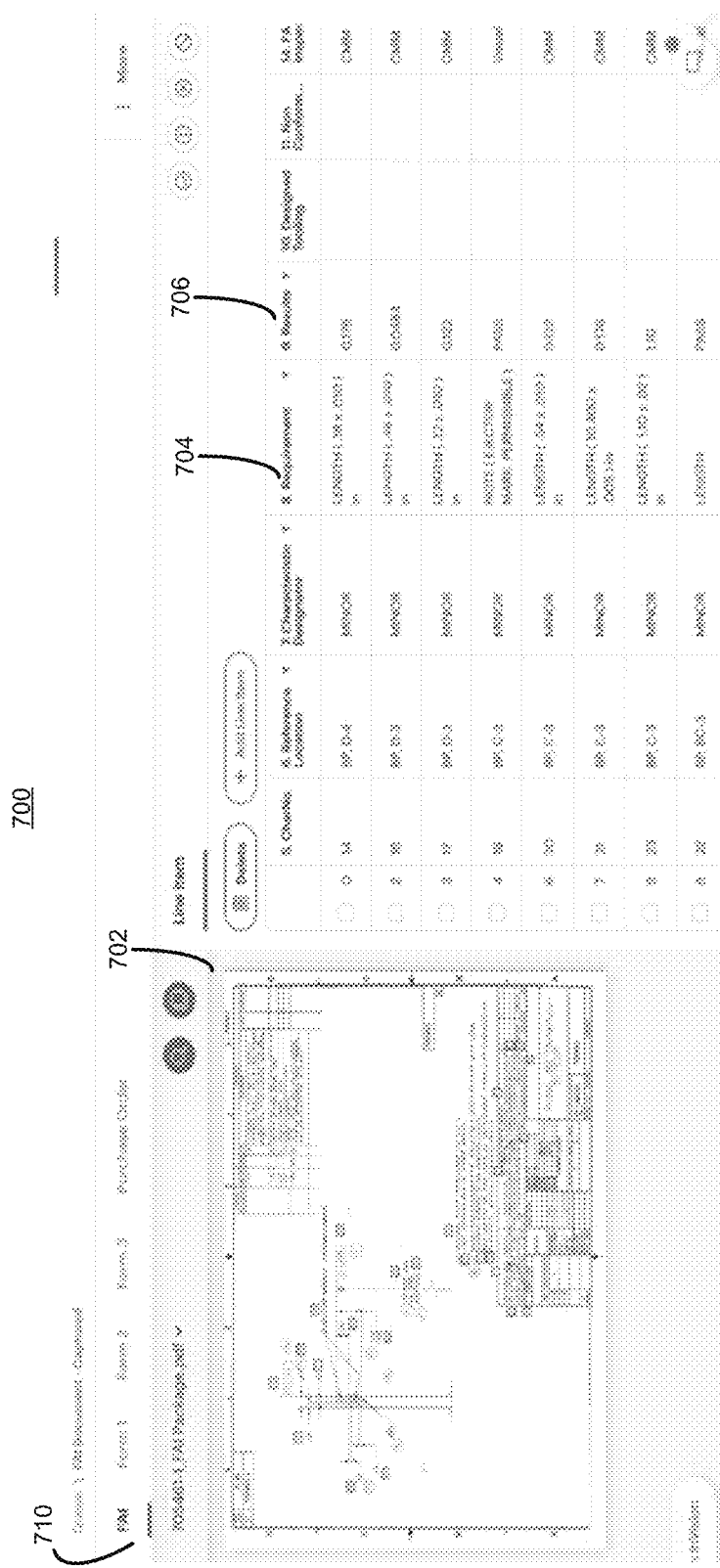
FIG. 7 shows an example output user interface (UI) displaying an engineering drawing in accordance with the examples disclosed herein.

FIG. 7 shows an example output user interface 700 showing an engineering drawing, the requirements, and the corresponding results generated by the system 100 in accordance with the examples disclosed herein. The output UI 700 includes the engineering drawing 702 being validated along with the requirements 704 and the validation results 706. The output UI 700 includes tabs 710 that allow a user to select for viewing one of the forms received in the document package 110. Some of the requirements 704 are expressed in terms of permissible ranges for the corresponding attributes. For such entries, the corresponding entry from the results 706 is compared with a corresponding rule generated from a regular expression to determine if the results entry falls within the range described in the requirements thereby providing the validation output.

Figure 8:
FIG. 8 shows yet another output UI generated for a human review of a validation document in accordance with the examples disclosed herein.

FIG. 8 shows yet another output UI 800 generated for a human review of the validation document in accordance with the examples disclosed herein. The output UI 800 allows the user examination of the annotation labels within the engineering drawing being evaluated by providing widgets e.g., image widget 822 for the parts identified by the annotation labels in the engineering drawings. For example, the selection of the image widget corresponding to the part with the annotation label 20 is selected, a display window 804 is popped up as an overlay on the corresponding portion of the engineering drawing can be viewed by selecting the corresponding image entry in the EDD Window Name column 802. The display window 804 includes the annotated part of an engineering drawing with an annotation label 842 and the corresponding attribute 844. As the engineering drawings are digitized and the positions of each of the annotation labels are recorded, the selection of the image entry corresponding to the specific annotation label enables the output UI generator to retrieve the corresponding portion of the image of the engineering drawing for a display to the user.

FIG. 9 shows an example of the list of parts with the statuses generated in accordance with the examples disclosed herein. Again, the entries from the results column 904 are processed by the automatic rules to determine if they comply with the corresponding entries/conditions set out in the requirements column 902. Different columns such as Form 3 conformance 906, EDD conformance 908 along with the corresponding confidence scores 910 are also included.

Figure 10:
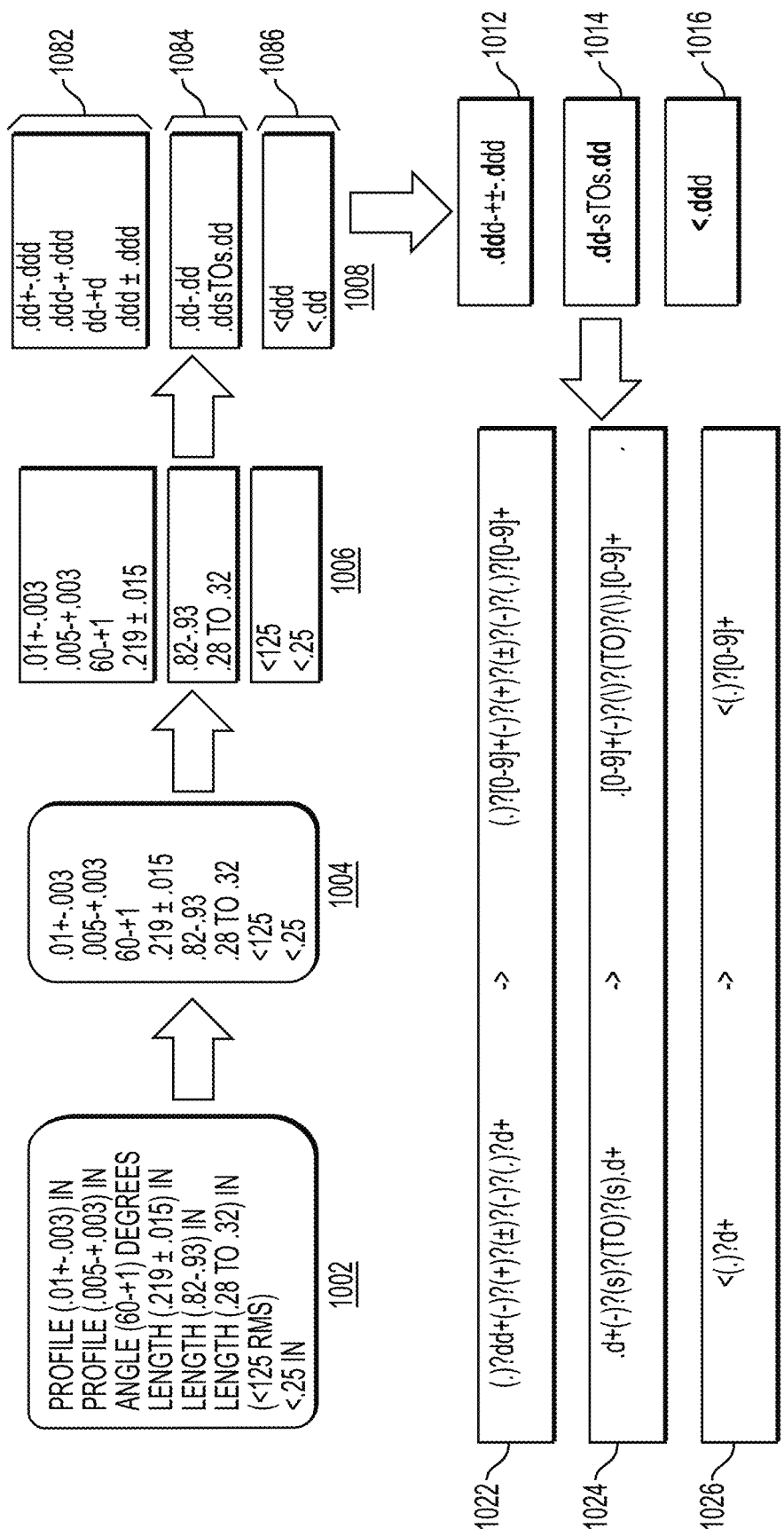
FIG. 10 illustrates an example of automatic rule generation for a given set of requirements in accordance with the examples disclosed herein.

FIG. 10 illustrates an example of automatic rule generation for a given set of requirements in accordance with the examples disclosed herein. The various requirements 1002 are initially preprocessed by removing the strings before the first numerical value and the strings after the last numerical value to generate a set of preprocessed requirements 1004. The preprocessed requirements 1004 are then clustered to generate a plurality of requirement clusters 1006. The requirements in each of the requirement clusters 1006 are encoded as described above by replacing digits with 'd', spaces with 's', and leaving the special characters unchanged to produce the encoded requirements 1008. At 1010, sequence alignment is used to identify similar patterns in each cluster. For example, at 1012, the 'dd−++−±d' is identified as a similar pattern that commonly exists in the requirements of the first cluster 1082. Similarly, the common patterns 1014 and 1016 are identified for the clusters 1084 and 1086. Finally, the regular expressions 1022, 1024, and 1026 are created as automatically generated rules to be used for validation of the engineering drawings 112.

Figure 11A:
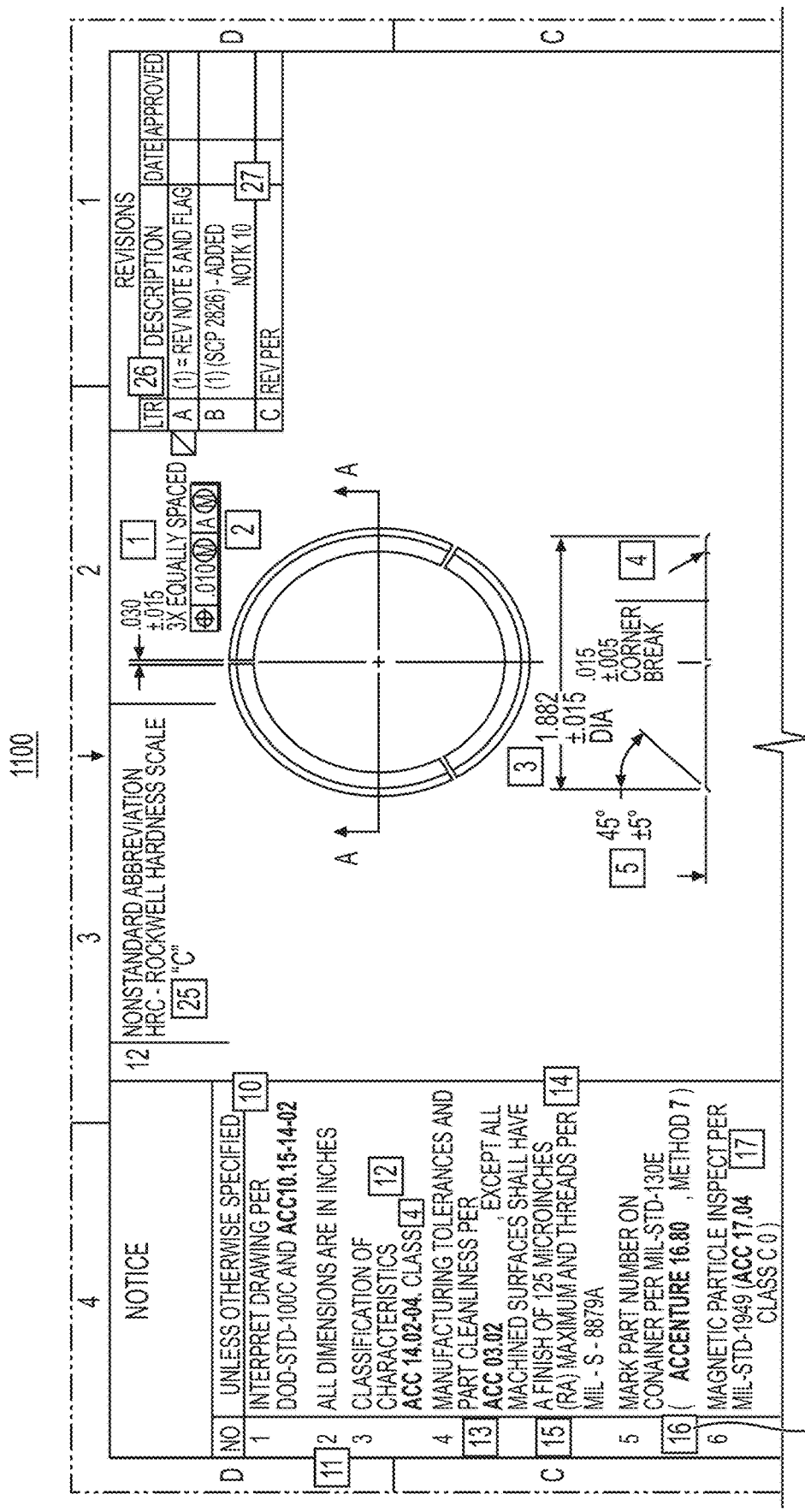
FIGS. 11A, 11B, and 11C show some non-limiting examples of engineering drawing templates processed in accordance with the examples disclosed herein.
Figure 11B:
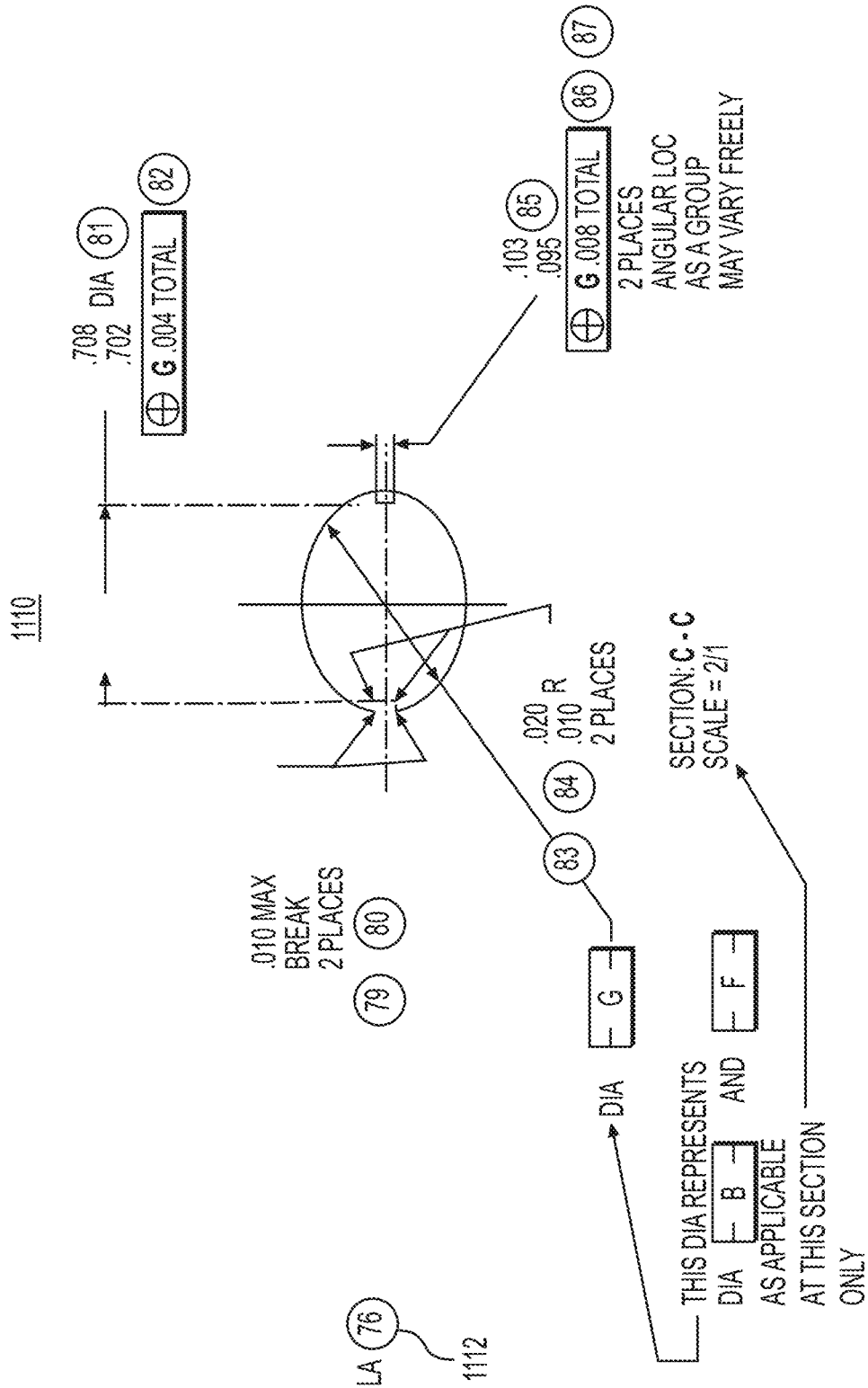
Figure 11C:
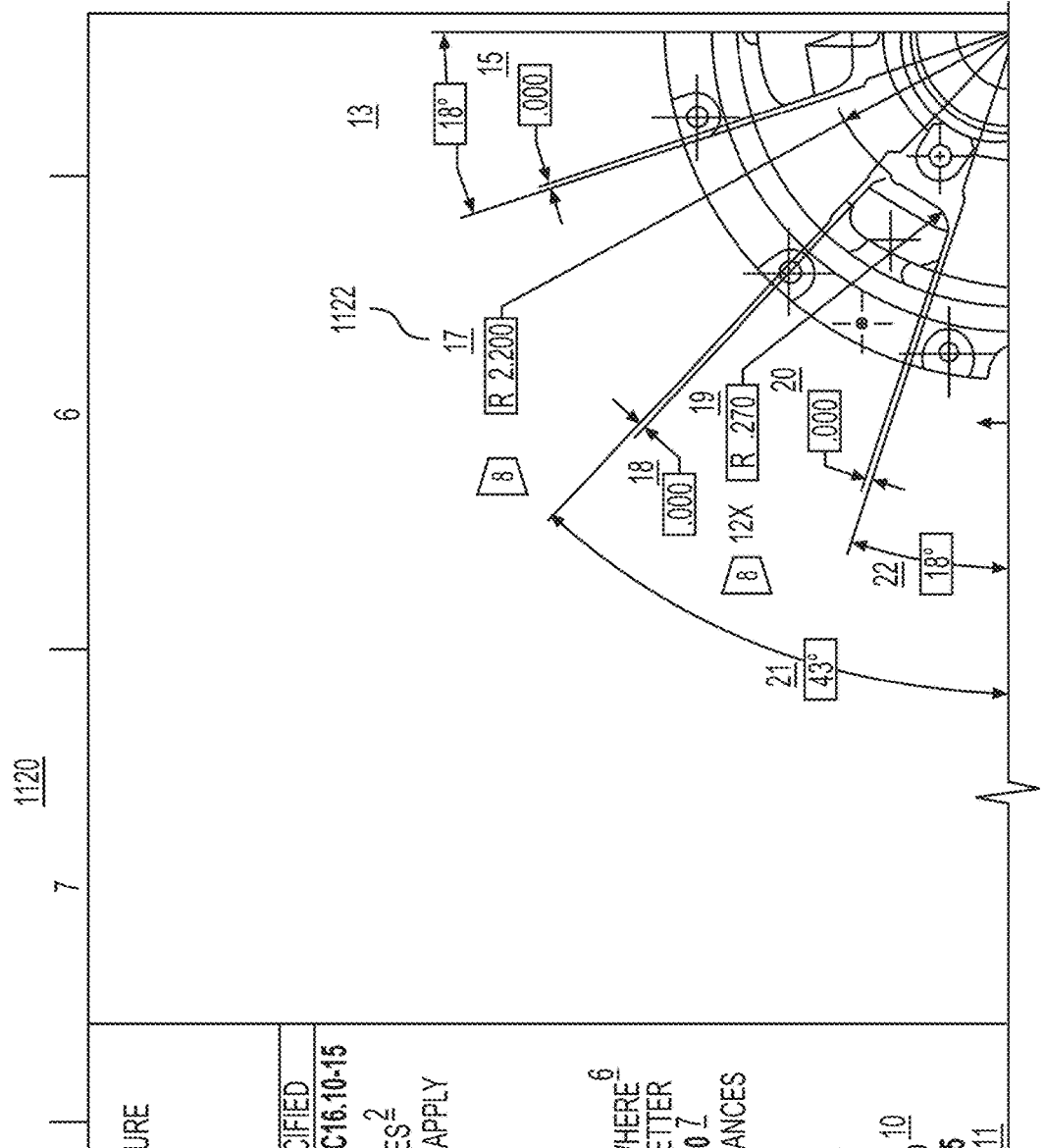
Figure 11C:
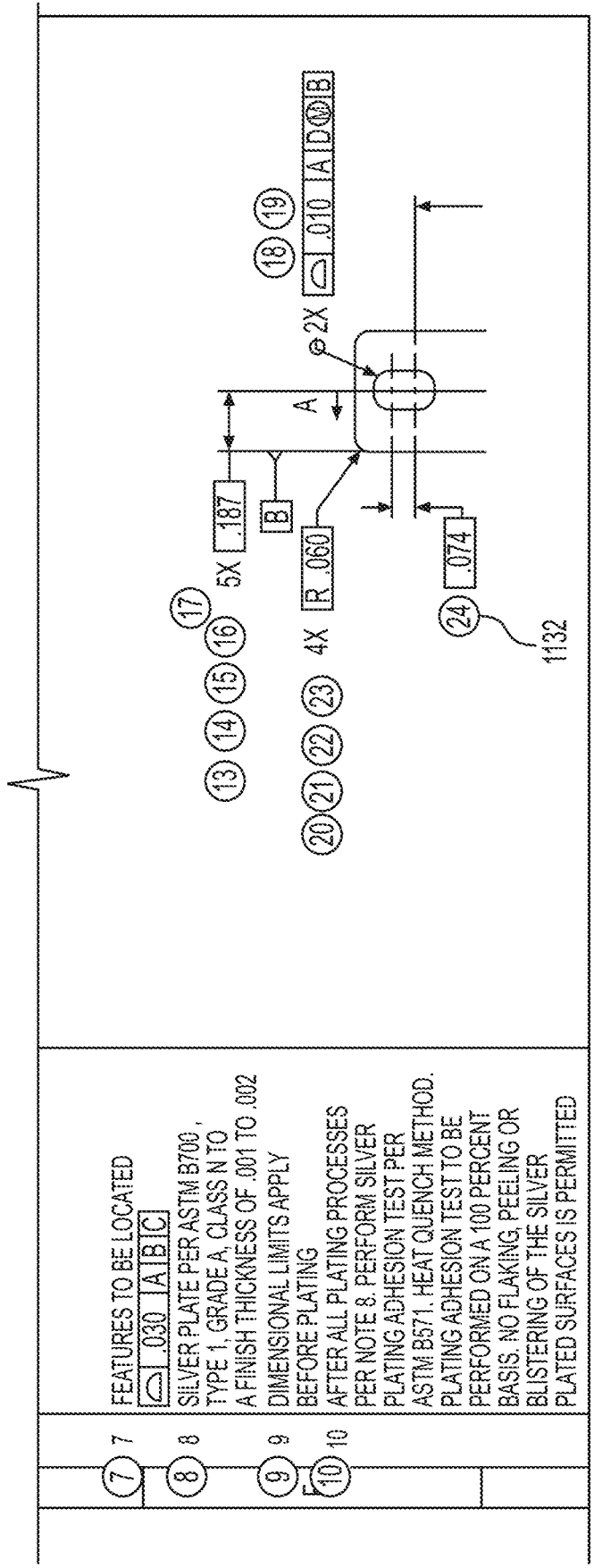

FIGS. 11A, 11B, and 11C show some non-limiting examples of engineering drawing templates that the system 100 is configured to validate in accordance with the examples disclosed herein.

FIG. 11A includes an engineering drawing 1100 with parts identified using colored annotation labels with identifying indicia such as numbers enclosed in rectangular boxes such as the annotation label 1102.

FIG. 11B includes engineering drawing 1110 with parts identified using colored annotation labels with numbers enclosed in circles such as the annotation label 1112.

FIG. 11C illustrates a special case wherein two FIGS. 1120 and 1130 are included in a single engineering drawing with parts identified using different annotation labels. FIG. 1120 includes colored annotation labels with plain numbers such as the annotation label 1122. FIG. 1130 includes colored annotation labels with identifying indicia enclosed in circles such as the annotation label 1132.

Figure 12:
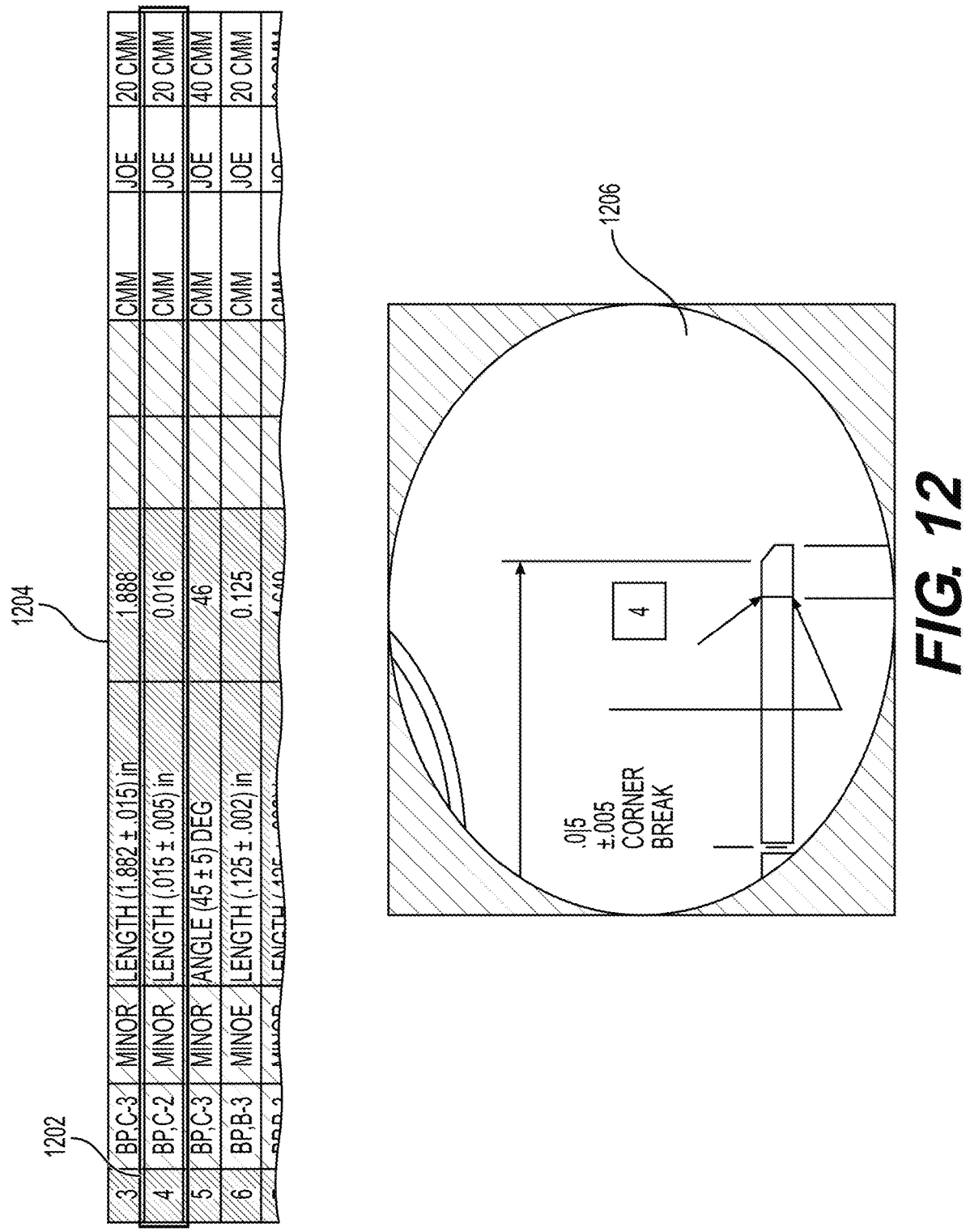
FIG. 12 shows example requirements and the corresponding portion of an engineering drawing evaluated for compliance with the requirements in accordance with the examples disclosed herein.

FIG. 12 an example of the requirements and corresponding portion of an engineering drawing evaluated for compliance with the rules in accordance with the examples disclosed herein. The requirements 1202 are outlined in the table 1204 and the range is given as '0.015±0.005'. The OCR data extractor 208 extracts from the zone region 1206, a data element '015+0.005 for corner break' with the annotation label including '4' as the identifying indicia. As the attributes extracted from the zone region 1206 matches the requirements 1202, the part with the annotation label '4' is determined to be fully compliant with the requirements. If the value associated with the label '4' is outside of the range represented by '0.015±0.005', then the portion associated with the label '4' would have been determined to be invalid. The determination regarding the validity of a given portion can be determined from a match score generated by the document validator 108 for the match between the output of the OCR data extractor 208 and the extracted data 142 from the requirements table. In some examples, the match score may be high enough so that the portion is not determined to be invalid but the match score may still not meet the criteria for the portion to be valid. In such instances, the particular part may be flagged for human review in the output UI.

Figure 13:
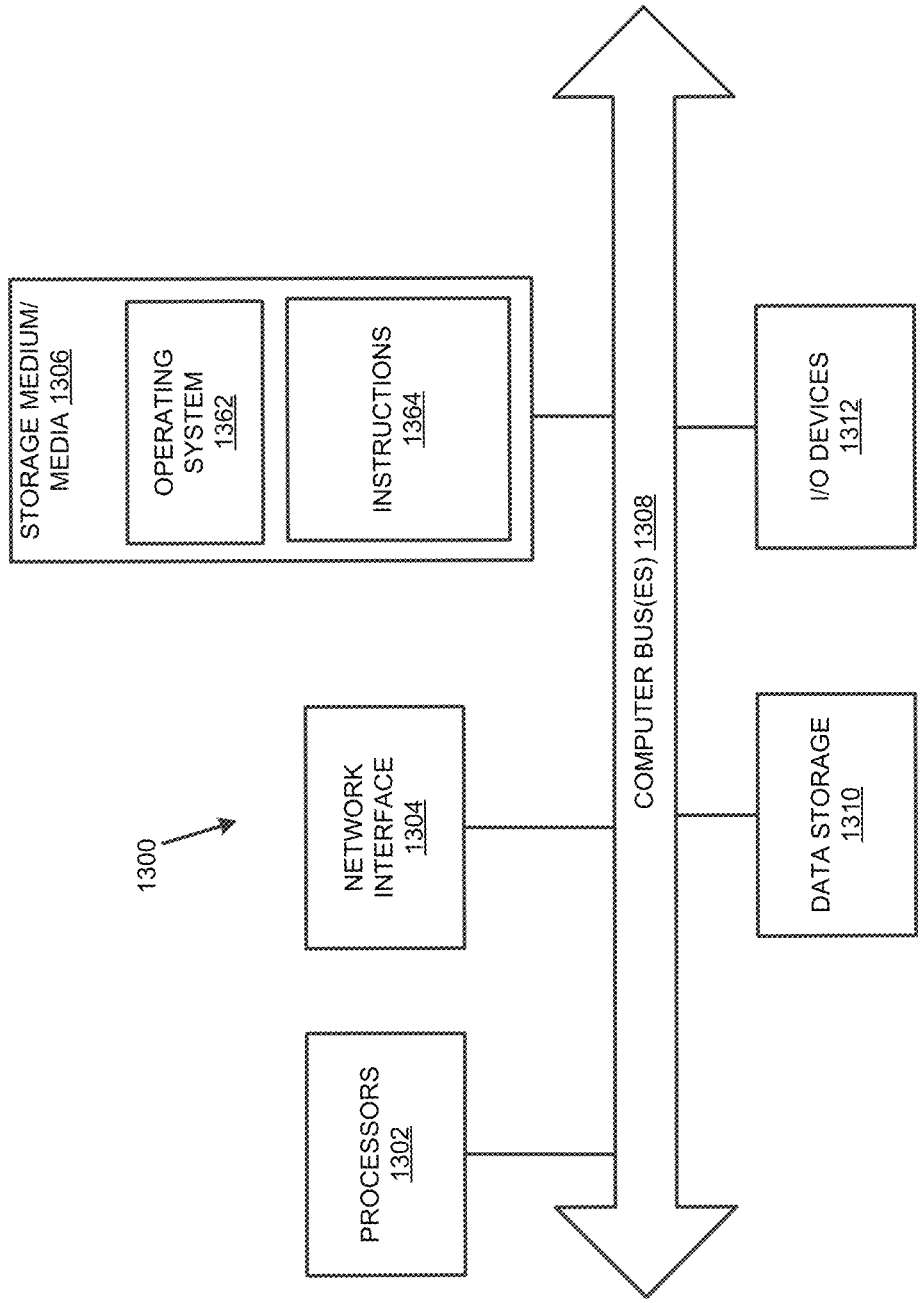
FIG. 13 illustrates a computer system that may be used to implement the automatic image validation system in accordance with the examples disclosed herein.

FIG. 13 illustrates a computer system 1300 that may be used to implement the automatic image validation system 100. More particularly, computing machines such as desktops, laptops, smartphones, tablets, and wearables which may be used to generate or access the data from the automatic image validation system 100 may have the structure of the computer system 1300. The computer system 1300 may include additional components not shown and that some of the process components described may be removed and/or modified. In another example, a computer system 1300 can sit on external-cloud platforms such as Amazon Web Services, AZURE® cloud or internal corporate cloud computing clusters, or organizational computing resources, etc.

The computer system 1300 includes processor(s) 1302, such as a central processing unit, ASIC or another type of processing circuit, input/output devices 1312, such as a display, mouse keyboard, etc., a network interface 1304, such as a Local Area Network (LAN), a wireless 802.11x LAN, a 3G, 4G or 5G mobile WAN or a WiMax WAN, and a processor-readable medium 1306. Each of these components may be operatively coupled to a bus 1308. The computer-readable medium 1306 may be any suitable medium that participates in providing instructions to the processor(s) 1302 for execution. For example, the processor-readable medium 1306 may be a non-transitory or non-volatile medium, such as a magnetic disk or solid-state non-volatile memory, or a volatile medium such as RAM. The instructions or modules stored on the processor-readable medium 1306 may include machine-readable instructions 1364 executed by the processor(s) 1302 that cause the processor(s) 1302 to perform the methods and functions of the automatic image validation system 100.

The automatic image validation system 100 may be implemented as software or machine-readable instructions stored on a non-transitory processor-readable medium and executed by one or more processors 1302. For example, the processor-readable medium 1306 may store an operating system 1362, such as MAC OS, MS WINDOWS, UNIX, or LINUX, and code 1364 for the automatic image validation system 100. The operating system 1362 may be multi-user, multiprocessing, multitasking, multithreading, real-time, and the like. For example, during runtime, the operating system 1362 is running and the code for the automatic image validation system 100 is executed by the processor(s) 1302.

The computer system 1300 may include a data storage 1310, which may include non-volatile data storage. The data storage 1310 stores any data used by the automatic image validation system 100. The data storage 1310 may be used to store the data packet 130, the rules 162, the extracted data 142, or other data elements, which are generated and/or used during the operation of the automatic image validation system 100.

The network interface 1304 connects the computer system 1300 to internal systems for example, via a LAN. Also, the network interface 1304 may connect the computer system 1300 to the Internet. For example, the computer system 1300 may connect to web browsers and other external applications and systems via the network interface 1304.

What has been described and illustrated herein is an example along with some of its variations. The terms, descriptions, and figures used herein are set forth by way of illustration only and are not meant as limitations. Many variations are possible within the spirit and scope of the subject matter, which is intended to be defined by the following claims and their equivalents.

What is claimed is:

1. An automatic image validation system, comprising:
at least one processor;
a non-transitory processor-readable medium storing machine-readable instructions that cause the processor to:
separately identify contents of a document package wherein the contents of the document package include at least a first document with one or more tables and a second document including one or more images of engineering drawings with parts, annotation labels for the parts, and specifications of the parts that are to conform to rules codified in the one or more tables;
automatically extract the rules from the one or more tables;
extract the specifications of the parts from the images by:
automatically identifying annotation labels identifying the parts within the engineering drawings;
detecting zone regions in the images corresponding to the annotation labels wherein each zone region includes in entirety, at least one of the annotation labels and specifications of at least one of the parts identified by the at least one annotation label; and
extracting from the images via optical character recognition (OCR), label data of the annotation labels and data elements corresponding to the label data within each of the zone regions as the specifications of the parts;
determine if each of the specifications of the parts conform to the automatically extracted rules; and
provide as a display on a user interface, a validation document including a list of the annotated parts marked as valid, invalid, or partial match based on confidence scores indicative of the conformance of the specifications of the annotated parts to corresponding rules,
the list of annotated parts includes corresponding image widgets wherein selection of one of the annotated parts from the list of annotated parts activates the corresponding image widget that causes a display of a corresponding portion from the engineering drawings that includes the selected annotated part.

2. The automatic image validation system of claim 1, wherein to automatically extract the rules, the processor is to:
   extract data from cells of requirements column of the one or more tables included in the first document; and
   generate preprocessed requirements by removing strings before a first numerical value and after a last numerical value in each cell of the requirements column.

3. The automatic image validation system of claim 2, wherein to automatically extract the rules, the processor is to further:
   cluster the preprocessed requirements;
   encode the requirement in each of the clusters by substituting predetermined symbols for digits and spaces in the preprocessed requirement while keeping special characters in the preprocessed requirement;
   identify similar patterns in each of the clusters; and
   convert the identified patterns of each cluster into corresponding regular expressions.

4. The automatic image validation system of claim 1, wherein to automatically identify the annotation labels, the processor is to further:
   identify each of the annotation labels that overlap each other separately by employing watershed segmentation.

5. The automatic image validation system of claim 1, wherein to automatically identify the annotation labels, the processor is to further:
   identify a color other than black and white used for the annotation labels;
   generate binary images of the engineering drawings by filtering out image information about colors other than the color used for the annotation labels; and
   identify coordinates of an extent of each image portion covered by the color used for the annotation labels, wherein each image portion is identified from the binary images.

6. The automatic image validation system of claim 5, wherein to identify the color the processor is to:
   identify a dominant color in the images other than black and white by implementing a color histogram procedure.

7. The automatic image validation system of claim 1, wherein to detect the zone regions within the images, the processor is to further:
   analyze a portion of one of the images as one of the zone regions wherein the portion includes the at least one annotation label.

8. The automatic image validation system of claim 7, wherein the portion is a circular portion and the processor is to further:
   select the circular portion of the image with a predetermined radius and center the circular portion on the at least one annotation label.

9. The automatic image validation system of claim 7, wherein to extract the label data the processor is to:
   recognize the annotation labels separately by employing a deep neural network (DNN) trained to separately identify individual annotation labels based on features including edges, texture, and color of the individual annotation labels.

10. The automatic image validation system of claim 1, wherein to determine if each of the specifications of the parts conform to the automatically extracted rules the processor is to:
    determine, for each annotation label, if the data element corresponding to the annotation label conforms to a corresponding rule of the automatically extracted rules, wherein the data element is matched with the corresponding rule based on an identifier included in the annotation label.

11. The automatic image validation system of claim 10, wherein to determine if the data element corresponding to the annotation label conforms to the corresponding rule the processor is to:
    determine if a numerical value included in the data element lies within an upper limit and a lower limit set forth by the corresponding rule.

12. A method of validating engineering drawings, comprising:
    receiving a document package wherein contents of the document package include at least a first document with one or more tables and a second document including one or more images of engineering drawings with parts, annotations for the parts and specifications of the parts that are to conform to rules codified in the one or more tables;
    automatically extracting the rules from the one or more tables;
    automatically identifying annotation labels identifying parts within the engineering drawings;
    detecting zone regions in the images corresponding to the annotation labels wherein each zone region includes in entirety, at least one of the annotation labels and specifications of at least one of the parts identified by the at least one annotation label;
    extracting from the images via optical character recognition (OCR), label data of the annotation labels and data elements corresponding to the label data within each of the zone regions as the specifications of the parts;
    identifying validity statuses that include validity or invalidity of each of the specifications of the parts based on conformance of the specifications to corresponding ones of the automatically extracted rules; and
    enabling for display on a user interface, a validation document including a list of the annotated parts with corresponding validity statuses, wherein
    the list of annotated parts includes corresponding image widgets wherein selection of one of the annotated parts from the list of annotated parts activates the corresponding image widget that causes a display of a corresponding portion from the engineering drawings that includes the selected annotated part.

13. The method of claim 12 wherein automatically extracting the rules further comprises:
    extracting data from cells of requirements column of the one or more tables included in the first document;
    generating preprocessed requirements by preprocessing the cell data of the requirements column by removing strings before a first numerical value and after a last numerical value in each cell of the requirements column;
    clustering the preprocessed cell data;
    encoding each preprocessed requirement in each of the clusters by substituting predetermined symbols for digits and spaces in the preprocessed requirement while keeping special characters in the preprocessed requirement unchanged;
    identifying similar patterns in each of the clusters; and
    converting the identified patterns of each cluster into corresponding regular expressions.

14. The method of claim 12 wherein detecting the zone regions in the images further comprises:
digitizing the one or more images of the engineering drawings;
identifying a color other than black and white used for the annotation labels from the digitized images;
generating binary images of the engineering drawings by filtering out image information about colors other than the color used for the annotation labels;
identifying coordinates of an extent of each image portion covered by the color used for the annotation labels, wherein each image portion is identified from the binary images;
identifying a dominant color in the images other than black and white by implementing a color histogram procedure; and
analyzing a portion of one of the images as one of the zone regions wherein the portion includes the at least one annotation label.

15. The method of claim 14, wherein the annotation labels include identifying indicia enclosed in a geometric figure.

16. A non-transitory processor-readable storage medium comprising machine-readable instructions that cause a processor to:
receive a document package for automatically executing a first article inspection process, wherein the document package includes at least a specification form and one or more images including engineering drawings that are to be validated per requirements provided in the specification form;
automatically generate rules corresponding to the requirements from tables in the specification form, wherein the rules are framed as regular expressions and enforce limits outlined in the requirements;
automatically identify annotation labels identifying parts within the engineering drawings;
detect zone regions in the images corresponding to the annotation labels wherein each zone region includes in entirety, at least one of the annotation labels and specifications of at least one of the parts identified by the at least one annotation label;
extract from the images via optical character recognition (OCR), label data of the annotation labels, and the specifications of the parts corresponding to the label data within each of the zone regions;
identifying validity statuses that include validity or invalidity of each of the specifications of the parts based on conformance of the specifications to the corresponding ones of the rules; and
enabling for display on a user interface, a first article inspection report including a list of the parts with corresponding validity statuses, wherein
the list of annotated parts includes corresponding image widgets wherein selection of one of the annotated parts from the list of annotated parts activates the corresponding image widget that causes a display of a corresponding portion from the engineering drawings that includes the selected annotated part.

17. The non-transitory processor-readable storage medium of claim 16, further comprising instructions that cause the processor to:
extract a supplier form additionally included in the document package; and
validate data from the supplier form by comparing the data with information retrieved from an external data source.

18. The non-transitory processor-readable storage medium of claim 16, further comprising instructions that cause the processor to:
update cells of a results column in the specification form with at least the specifications of the parts corresponding to the label data associated with the cells, wherein the corresponding label data is identified by correlating identifiers from the specification form with identifiers included in the annotation labels.

19. The non-transitory processor-readable storage medium of claim 16, further comprising instructions that cause the processor to:
automatically label the parts as one valid, invalid, and partially valid based on a comparison of match scores of the parts with a first threshold and a second threshold.

* * * * *